United States Patent [19]

Tanaka et al.

[11] Patent Number: 4,757,121

[45] Date of Patent: Jul. 12, 1988

[54] SILICONE-BASED SOFTENING AGENT FOR SYNTHETIC FIBERS

[75] Inventors: Masaki Tanaka; Hiroshi Ohashi, both of Annaka, Japan

[73] Assignee: Shin-Etsu Chemical Co., Ltd., Tokyo, Japan

[21] Appl. No.: 96,651

[22] Filed: Sep. 15, 1987

[30] Foreign Application Priority Data

Sep. 19, 1986 [JP]   Japan ................................ 61-221492

[51] Int. Cl.$^4$ ............................................. C08G 77/04
[52] U.S. Cl. ........................................ 528/27; 528/26; 528/38; 528/33; 528/18; 252/8.6
[58] Field of Search ..................... 252/8.6; 528/26, 27, 528/38

[56] References Cited

U.S. PATENT DOCUMENTS 4,476,188  10/1984  Blizzard ............................... 428/332

FOREIGN PATENT DOCUMENTS 2041378  2/1987  Japan .

Primary Examiner—Paul Lieberman
Assistant Examiner—Isabelle Rodriguez
Attorney, Agent, or Firm—Wyatt, Gerber Shoup and Badie

[57] ABSTRACT

The inventive composition is a silicone-based softening agent for synthetic fibers such as waddings of polyester fibers without the disadvantage of yellowing caused by heat or in the lapse of time. The essential ingredients of the inventive composition are a combination of two different amino-substituted organopolysiloxanes, an opoxy-containing alkoxysilane compound such as 3-glycidyloxypropyl methyl dimethoxy silane and a monoepoxy compound such as glycidyl alcohol each in a specified amount. Characteristically, one of the amino-substituted organopolysiloxane components is a reaction product of an amino-substituted organopolysiloxane and an organic opoxy compound.

3 Claims, No Drawings

SILICONE-BASED SOFTENING AGENT FOR SYNTHETIC FIBERS

BACKGROUND OF THE INVENTION

The present invention relates to a finishing agent of fibers or, more particularly, to a silicone-based softening agent of waddings of synthetic fibers capable of giving excellent softness to the treated wadding without the disadvantage of yellowing of the wadding caused by heat or in the lapse of time.

Waddings of synthetic fibers such as polyester fibers and acrylic fibers are required to give a pleasant touch of smoothness and softness which can be imparted thereto by a treatment with a softening agent. Various kinds of softening agents have been developed and used in the prior art.

Known softening agents suitable for the purpose include, for example, a combination of an epoxy-modified organopolysiloxane and an amino-substituted organopolysiloxane, a combination of an epoxy-modified organopolysiloxane and an organic amino compound and a combination of an aminosubstituted organopolysiloxane and an organic epoxy compound disclosed in Japanese Patent Publication No. 48-17514, a combination of a high-polymeric dimethylpolysiloxane and an aminoalkoxy silane disclosed in Japanese Patent Publication No. 51-37996, a combination of an epoxy-modified organopolysiloxane and an aminoalkoxy silane disclosed in Japanese Patent Publications Nos. 53-19715 and 53-19716, and so on. These softening agents of prior art are each effective to impart waddings of synthetic fibers with smoothness and softness to exhibit a pleasant feeling of touch something like light feathers.

These silicone-based softening agents of prior art, however, have a very serious problem that the wadding of synthetic fibers treated with the softening agent are subject to yellowing already in the course of the treatment involving a step of heating or in the lapse of time during storage or use so that the commercial value of the wadding is greatly decreased. Therefore, it is eagerly desired in the fabric industry to develop a softenig agent for synthetic fiber-made waddings improved in this regard.

SUMMARY OF THE INVENTION

The present invention accordingly provides an improved silicone-based softening agent for synthetic fiber-made waddings, which comprises:
(A) 100 parts by weight of a combination of two organopolysiloxanes composed of
(A-1) from 5 to 95% by weight of a first amino-substituted organopolysiloxane having a viscosity in the range from 100 to 1,000,000 centistokes at 25° C. and having a substantially linear molecular structure represented by the general formula $$XO\text{-}(SiR_2\text{---}O)_m(SiZR\text{---}O)_n X, \quad (I)$$

in which R is a monovalent hydrocarbon group having from 1 to 20 carbon atoms; Z is an amino-substituted monovalent hydrocarbon group of the formula $$-R^1\text{-}(NHCH_2CH_2)_a NR^2_2, \quad (II)$$

$R^1$ being a divalent hydrocarbon group having 1 to 10 carbon atoms, $R^2$ being a hydrogen atom or a monovalent hydrocarbon group having 1 to 20 carbon atoms and the subscript a being zero or a positive integer not exceeding 4, X is a hydrogen atom or a monovalent hydrocarbon group having 1 to 10 carbon atoms, and m and n are each a positive integer, the number of the amino-substituted groups denoted by Z in a molecule being 1% or less of the total number of the groups denoted by R and Z, and (A-2) from 95 to 5% by weight of a second amino-substituted organopolysiloxane which is a reaction product of
(A-2a) a liquid amino-substituted organopolysiloxane represented by the average unit formula $$Z_b R_c SiO_{(4-b-c)/2}, \quad (III)$$

in which Z and R each have the same meaninq as defined above, b is a positive number not exceeding 1 and c is a positive number smaller than 2 with the proviso that b+c is in the range from 1.9 to 2.1, and (A-2b) a liquid organic epoxy compound having at least one epoxy group in a molecule in such an amount that from 0.01 to 20 moles of the epoxy groups are provided per mole of the nitrogen atoms in the amino-substituted organopolysiloxane as the component (A-2a);

(B) from 1 to 50 parts by weight of an epoxy-containing alkoxy silane compound; and
(C) from 1 to 50 parts by weight of a monoepoxy compound represented by the general formula $$G\text{---}R^3\text{---}OY, \quad (IV)$$

in which G is a group of epoxy residue, $R^3$ is a divalent hydrocarbon group and Y is a hydrogen atom or a group selected from the class consisting of acyl groups, acryl group, methacryl group and silyl groups represented by the general formula $$\text{-}(SiMe_2\text{---}O)_e SiMe_3, \quad (V)$$

Me being a methyl group and e being zero or a positive integer not exceeding 5.

DETAILED DESCRIPTION OF THE PREFERRED EMBODIMENTS

As is described in the above given summary of the invention, the inventive softening agent for synthetic fiber-made waddings essentially contains the components (A-1), (A-2), (B) and (C) each in the specified amount. This formulation of the softening agent established as a result of the extensive investigaions is very advantageous in respect of the absence of the disadvantage of yellowing in the treated wadding by heat or in the lapse of time in addition to the excellent feeling of softness and smoothness imparted to the treated wadding.

The component (A-1) is a diorganopolysiloxane having a substantially linear molecular structure and represented by the general formula (I) given above. In the formula, R is a monovalent hydrocarbon group having 1 to 20 carbon atoms exemplified by alkyl groups, e.g., methyl, ethyl, propyl, butyl, octyl and dodecyl groups, alkenyl groups, e.g., vinyl and allyl groups, aryl groups, e.g., phenyl, tolyl, xylyl and naphthyl groups, aralkyl groups, e.g., 2-phenylethyl group, and cycloalkyl groups, e.g., cyclopentyl and cyclohexyl groups, as well as those substituted groups obtained by replacing a part or all of the hydrogen atoms in the above named hydrocarbon groups with substituents such as halogen atoms, cyano groups and the like including chloromethyl, 3,3,3-trifluoropropyl and cyanomethyl groups.

The symbol Z denotes an amino-substituted monovalent hydrocarbon group represented by the general formula (II) given above, in which $R^1$ is a divalent hydrocarbon group having 1 to 10 carbon atoms exemplified by methylene, ethylene, propylene, butylene, hexamethylene and phenylene groups, $R^2$ is a hydrogen atom or a monovalent hydrocarbon group having 1 to 20 carbon atoms and exemplified by the same groups given above as the examples of the monovalent hydrocarbon group denoted by R in the general formula (I), and the subscript a is zero or a positive integer not exceeding 4. Exemplary of the amino-substituted group denoted by Z are 3-aminopropyl group, 4-aminobutyl group, 5-aminopentyl group, 3-(N-2-aminoethyl)aminopropyl group, —$CH_2CH_2CH_2$—$(NH$—$CH_2CH_2)_2NH_2$, 4-aminophenyl group and the like. The group at the molecular chain end and denoted by the symbol X is a hydrogen atom or a monovalent hydrocarbon group having 1 to 10 carbon atoms exemplified by the same groups given above as the examples of the group denoted by R, of which alkyl groups are preferred. Namely, the diorganopolysiloxane as the component (A-1) should be terminated at each molecular chain end with a hydroxy group or alkoxy group which serves as a functional group to react with the epoxy-containing alkoxysilane compound as the component (B) forming a film of a crosslinked composition on the fiber surface. The subscripts m and n are each a positive integer so that the diorganopolysiloxane should contain each at least one amino-containing and amino-free siloxane units.

The diorganopolysiloxane as the component (A-1) should have a viscosity in the range from 100 to 1,000,000 centistokes or, preferably, from 1000 to 100,000 centistokes at 25° C. When a diorganopolysiloxane having a viscosity lower than 100 centistokes at 25° C. is used as the component (A-1), the wadding treated with the softening agent cannot be imparted with full smoothness. When the viscosity of the diorganopolysiloxane is too high, difficulties are encountered in the preparation procedure of the softening agent including the steps of dissolution in an organic solvent, emulsification in an aqueous medium and the like.

While the diorganopolysiloxane as the component (A-1) should contain at least one amino-substituted group denoted by the symbol Z in a molecule, it is preferable that the number of the groups Z in the molecule should be in the range from 0.01 to 1.0% of the total number of the groups denoted by R and Z. When the content of the amino-containing groups is too large to exceed the above mentioned upper limit, a disadvantage is caused that the wadding treated with the softening agent may be subject to some yellowing.

The amino-containing diorganopolysiloxane as the component (A-1) can be prepared, for example, by the siloxanere-arrangement polymerization of octamethylcyclotetrasioxane and hexamethyldisiloxane together with a hydrolysis product of an amino-substituted alkoxy silane such as 3-aminopropyl methyl dimethoxy silane and 3-(N-2-aminoethyl)aminopropyl methyl dimethoxy silane under heating in the presence of a strong alkaline compound such as potassium hydroxide. When an aminoalkyl dialkoxy silane is used in this reaction, alkoxy groups can be introduced into the molecular chain ends. When an α,ω- dihydroxy dimethylpolysiloxane is used in the reaction, the resultant diorganopolysiloxane is blocked at each molecular chain end with a hydroxy group.

The component (A-2) is a reaction product of (A-2a) an amino-containing liquid organopolysiloxane and (A-2b) an organic liquid epoxy compound. The reactant (A-2a) is represented by the average unit formula (III) given above, in which Z and R each have the same meaning as defined above. The monovalent hydrocarbon group denoted by R in the formula (III) may contain a polyoxyalkylene linkage therein. The subscript b is a positive number not exceeding 1 and c is a positive number smaller than 2 with the proviso that b+c is in the range from 1.9 to 2.1. This limitation means that the organopolysiloxane as the reactant (A-2a) has a substantially linear molecular structure although a small amount of molecular branches may be contained therein. The terminal groups of the organopolysiloxane may be trialkylsilyl groups but optionally the terminal silyl group may have a silanolic hydroxy group and an alkoxy group such as methoxy and ethoxy groups.

Such an amino-containing organopolysiloxane as the reactant (A-2a) can be prepared, for example, by the so-called alkali-catalyzed re-equilibration reaction in which a polycondensation reaction takes place in the presence of an alkaline compound such as potassium hydroxide in a ternary mixture composed of octamethylcyclotetrasiloxane, hexamethyl disiloxane and a hydrolysis product of an amino-substituted alkoxy silane compound such as 3-(N-2-aminoethyl)aminopropyl methyl dimethoxy silane. Besides the 3-(N-2-aminoethyl)aminopropyl methyl siloxane units which can be introduced into the organopolysiloxane by using the above mentioned 3-(N-2-aminoethyl)aminopropyl methyl dimethoxy silane, the siloxane units having an amino-substituted group to compose the organopolysiloxane include those expressed by the following formulas:

—(SiMe[$(CH_2)_3NH_2$]—O)—,
—(SiMe[$(CH_2)_2NHCH_2CH_2NHCH_2CH_2NH_2$]—O)—,
—(Si[$(CH_2)_3NH_2$]$_2$—O)—,
—(Si[$(CH_2)_3NHCH_2CH_2NH_2$]$_2$—O)—,
—Si[$(CH_2)_3NHCH_2CH_2NH_2$]$O_{3/2}$,   —Si[$(CH_2)_3NH_2$]$O_{3/2}$.

The amino-containing organopolysiloxane as the reactant (A-2a) should be a liquid having a viscosity in the range from 100 to 1,000,000 centistokes or, preferably, from 100 to 100,000 centistokes at 25° C. in view of the workability and reactivity with the other reactant (A-2b) described below.

The reactant (A-2b) to be reacted with the above described reactant (A-2a) is an organic epoxy compound, which is liquid at room tempeerature, having at least one epoxy group in a molecule. The organic group to which the epoxy group is bonded should preferably be a monovalent hydrocarbon group optionally having an hydroxy group, halogen atom, methacryloxy group and ether linkage as well as a polyoxyalkylene linkage. Exemplary of the epoxy compounds are glycidyl alcohol, 3,4-epoxy butyl alcohol, polyoxyethylene monoglycidyl ethers, allyl glycidyl ether, glycidyl methacrylate, epichlorohydrin, 3,4-epoxy vinylcyclohexane and the like.

The reactants (A-2a) and (A-2b) should be reacted in such a ratio of the amounts that from 0.01 to 20 moles or, preferably, from 0.1 to 10 moles of the epoxy groups in the reactant (A-2b) are provided per mole of the nitrogen atoms contained in the reactant (A-2a). The reaction can be performed by heating a mixture of the reactants so that the active hydrogen atoms in the amino group and/or imino group in the reactant (A-2a) are blocked with the epoxy groups to form a linkage of —NH—CH$_2$—CHOH— or >N—CH$_2$—CHOH—.

The component (A-2) as a product of the above mentioned reaction is used in combination with the component (A-1) in the component (A) to fully and synergistically exhibit the effect of imparting the treated wadding with a pleasant feeling of softness and smoothness not obtained when either of the components (A-1) and (A-2) is omitted. Therefore, the components (A-1) and (A-2), each being an amino-modified organopolysiloxane but having a different chemical structure from the other, should be used in combination in a weight ratio (A-1):(A-2) from 95:5 to 5:95 or, preferably, from 50:50 to 90:10 in order to exhibit the above mentioned synergistic effect.

The component (B) comprised in the inventive softening agent is an epoxy-containing alkoxy silane compound which is a silane compound having each at least one of epoxy and alkoxy groups in a molecule. Such a silane compound is well known in the art as a so-called carbon-functional silane used as a surface-treatment agent of various kinds of substrate materials. Exemplary of suitable epoxy-containing alkoxy silane compounds are 3-glycidyloxypropyl trimethoxy silane, 3-glycidyloxypropyl methyl dimethoxy silane, 2-(3,4-epoxycyclohexyl)ethyl trimethoxy silane, 2-(3,4-epoxycyclohexyl)ethyl methyl dimethoxy silane, 3-glycidyloxypropyl triethoxy silane, 3-glycidyloxypropyl methyl diethoxy silane, 2-(3,4-epoxycyclohexyl)ethyl triethoxy silane, 2-(3,4-epoxycyclohexyl)ethyl methyl diethoxy silane and the like.

The amount of the component (B) in the inventive softening agent should be in the range from 1 to 50 parts by weight or, preferably, from 10 to 30 parts by weight per 100 parts by weight of the combination of the components (A-1) and (A-2). When the amount of the component (B) is too small, the softening effect obtained by the treatment of a wadding with the softening agent would be less durable. When the amount thereof is too large, on the other hand, the wadding treated with the softening agent is imparted with some stiffness to the contrary of the object of the invention. It is optional that the above described epoxy-containing alkoxy silane compound is used as a partial hydrolysis product thereof although no particular advantage is obtained thereby in comparison with the use of a silane compound as such.

The component (C) in the inventive softening agent is an organic monoepoxy compound represented by the general formula (IV) given above, which serves to prevent yellowing of the wadding treated with the softening agent along with contribution to the improvement of feeling of the treated wadding with smoothness and softness. In the general formula (IV), G is an epoxy group, R$^3$ is a divalent hydrocarbon group and Y is a hydrogen atom or a group selected from the class consisting of acyl groups, (meth)acryl group and silyl groups represented by the general formula (V) given above. Exemplary of the epoxy compound suitable as the component (C) are glycidyl alcohol, glycidyl methacrylate, glycidyloxy trimethyl silane, glycidyloxy pentamethyl disiloxane, glycidyl acetate and the like.

The amount of the epoxy compound as the component (C) in the inventive softening agent should be in the range from 1 to 50 parts by weight or, preferably, from 10 to 30 parts by weight per 100 parts by weight of the combination of the components (A-1) and (A-2). When the amount thereof is too small, the desired preventing effect against yellowing and the improving effect on the feeling of the treated wadding cannot be fully exhibited. When the amount thereof is too large, on the other hand, the film formed by curing of the softening agent on the fiber surface may have some stiffness so that the feeling of the treated wadding cannot be improved as desired.

The softening agent of the invention can be prepared by uniformly blending the above described components (A-1), (A-2), (B) and (C) each in a calculated and weighed amount. It is optional according to desire to improve the workability in the treatment of a wadding with the inventive softening agent that the blend of the above mentioned four components is diluted with a suitable organic solvent such as an aromatic hydrocarbon solvent, e.g., benzene, toluene and xylene, petroleum solvent, e.g., naphtha and kerosine, chlorinated hydrocarbon solvent, e.g., trichloroethylene, perchloroethylene and trichloroethane, and fluorinated hydrocarbon solvent. Alternatively, the inventive softening agent may be emulsified in an aqueous medium using a suitable emulsifying agent such as a non-ionic surface active agent, e.g., polyoxyethylene alkyl ethers and polyoxyethylene phenyl ethers, and a cationic surface active agent, e.g., quaternary ammonium salts and ethylene oxide adducts of quaternary ammonium salts. The stability of such an aqueous emulsion can be improved by partially neutralizing the amino groups in the components (A-1) and (A-2) with addition of a carboxylic acid such as formic, acetic and glycolic acids. It is further optional that a curing catalyst is added to the above described organic solution of aqueous emulsion of the inventive softening agent. The curing catalyst may be a compound known in the art of silicones including carboxylates of a metal such as zinc, titanium, aluminum, tin, zirconium and the like.

Treatment of a synthetic fiber-made wadding with the inventive softening agent in the form of an organic solution or aqueous emulsion is performed by a conventional method such as oiling-roller method, spray method and the like. The amount of the inventive softening agent to be deposited on the fibers of the wadding should be in the range from 0.1 to 2.0% by weight or, preferably, from 0.2 to 1.0% by weight after evaporation of the organic solvent in the solution or water as the dispersion medium of the aqueous emulsion.

The softening agent of the invention can be used for the treatment of any kind of synthetic fibers but is particularly suitable for the treatment of polyester fibers, acrylic fibers, nylon fibers, polypropylene fibers and the like to impart the treated fibers with a very pleasant feeling of softness and smoothness without the disadvantage of discoloration or yellowing caused by heat or in the lapse of time during storage and use.

In the following, the softening agent of the invention is described in more detail by way of examples, in which the term of "parts" always refers to "parts by weight" and the values of viscosity are all those obtained by the measurement at 25° C. The wadding treated with the softening agent in each of the examples was evaluated in respect of the items including softness and smoothness, resistance against yellowing and durability in dry cleaning according to the criteria given below.

[Softness and Smoothness]

The result of the treatment was evaluated organoleptically in four ratings of A, B, C and D in the following criteria.
A: Excellent feather-like feeling of touch
B: Good feather-like feeling of touch
C: Somewhat coarse and rough feeling of touch with poor slipperiness
D: Coarse and rough feeling of touch with no slipperiness

[Resistance against Yellowing]

The synthetic fiber-made wadding after treatment with the softening agent was heated at 200° C. for 30 minutes and the degree of yellowness was visually examined to give the results in four ratings A, B, C and D according to the following criteria.
A: Absolutely no yellowing
B: Little yellowing
C: Slight but noticeable yellowing
D: Deep yellowing

[Durability in dry cleaning]

The treated wadding was subjected to a dry cleaning test according to the procedure specified in JIS L 0860 "Testing Method of Color Fastness against Dry Cleaning" using perchloroethylene and anionic and non-ionic surface active agents followed by the evaluation tests for the softness and smoothness. The results are given in four ratings of A, B, C and D according to the criteria mentioned above.

EXAMPLE 1

Into a glass-made reaction vessel of 1 liter capacity equipped with a thermometer and a stirrer were introduced 6.18 g of 3-(N-2-aminoethyl)aminopropyl methyl dimethoxy silane, 4.80 g of a cyclic organopolysiloxane which was a hydrolysis product of 3-(N-2-aminoethyl)aminopropyl methyl dimethoxy silane composed of 3-(N-2-aminoethyl)aminopropyl methyl siloxane units, 666 g of octamethyl cyclotetrasiloxane and 0.06 g of potassium hydroxide as a catalyst and the reaction mixture in the vessel was heated with agitation at 150° C. for 6 hours under a stream of nitrogen gas to effect polymerization followed by the addition of 0.4 g of ethylene chlorohydrin and further agitation of the mixture at 100° C. for 1 hour to neutralize potassium hydroxide. The reaction mixture was then freed from low-boiling constituents by stripping at 140° C. under a pressure of 5 mmHg to give an amino-substituted organopolysiloxane which is referred to as the aminosiloxane A hereinbelow. The aminosiloxane A had a viscosity of 2700 centistokes and contained 3.5% by weight of a volatile matter as determined by heating at 105° C. for 3 hours. The amine equivalent of this aminosiloxane A was 5640 g/mole N corresponding to the formula

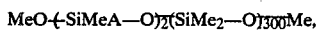

in which Me is a methyl group and A is a 3-(N-2-aminoethyl)aminopropyl group of the formula $NH_2CH_2CH_2—NH—CH_2\ CH_2CH_2—$.

In a similar manner to the above described procedure, separately, 12.8 g of the hydrolysis product of 3-(N-2-aminoethyl)aminopropyl methyl dimethoxy silane, 583.7 g of octamethyl cyclotetrasiloxane, 2.60 g of hexamethyl disiloxane and 0.045 g of potassium hydroxide were introduced into a reaction vessel and the mixture was heated at 140° C. for 10 hours with agitation under a stream of nitrogen gas to effect the polymerization reaction. The reaction was terminated by neutralizing potassium hydroxide in the mixture with addition of 0.32 g of ethylene chlorohydrin to the mixture kept at 100° C. and agitation of the mixture for 2 hours at the same temperature.

A 100 g portion of the thus prepared amino-modified organopolysiloxane was introduced into a reaction vessel of 300 ml capacity together with 50 g of toluene and 1.65 g of glycidyl alcohol and the mixture was agitated at 80° C. for 5 hours to effect the reaction followed by removal of the lowboiling matter by stripping at 80° C. under a reduced pressure of 10 mmHg. The thus obtained product, which is referred to as the aminosiloxane B hereinbelow, had a viscosity of 6800 centistokes and a refractive index of 1.412. The aminosiloxane B had a chemical structure derived from an aminosubstituted organopolysiloxane of the formula

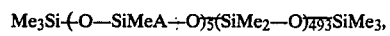

in which Me and A each have the same meaning as defined above, by converting a half number of the amino groups into groups of the formula $—NH—CH_2—CHOH—CH_2OH$ by the reaction of the active hydrogen atoms of the amino groups with glycidyl alcohol.

An aqueous emulsion, which is referred to as the emulsion A hereinbelow. was prepared by vigorously agitating a mixture composed of 25 parts of the aminosiloxane A, 5.0 parts of the aminosiloxane B, 5 parts of a polyoxyethylene alkyl phenyl ether as a non-ionic surface active agent and 65 parts of water followed by the addition of 2 parts of acetic acid to adjust the pH to 5.0. A 10 parts portion of the emulsion A was admixed with 1.0 part of 3-glycidyloxypropyl trimethoxy silane (KBM 403, a product by Shin-Etsu Chemical Co., Japan), 1.0 part of glycidyl alcohol and 88 parts of water to give a diluted emulsion of the softening agent, which is referred to as the treatment bath I hereinbelow.

A wadding of polyester staples each having a fineness of 6 denier and a length of 64 mm was immersed in the treatment bath I followed by centrifugal removal of the extraneous portion of the liquid to such an extent that the amount of the deposited softening agent was 0.1% by weight calculated as solid. The wadding wet with the treatment bath was dried at 150 τ for 10 minutes to give a softener-treated wadding. The thus treated wadding was subjected to the tests of softness and smoothness and durability in dry cleaning as well as to the test of resistance against yellowing by heating at 200 τ for 30 minutes to give the results shown in Table 1 below which also shows the results obtained of the same wadding before the treatment as a control.

TABLE 1

| | Treated wadding | Untreated wadding |
|---|---|---|
| Softness and smoothness | A | D |
| Resistance against yellowing | A | A |
| Durability in dry cleaning | B | D |

EXAMPLE 2

In a similar manner to the preparation of the aminosiloxane A in Example 1, an amino-substituted organopolysiloxane, which is referred to as the aminosiloxane C hereinbelow, was prepared by agitating and heating a mixture
composed of 15.2 g of an α,107 -dihydroxy dimethylpolysiloxane having a degree of polymerization of 10, 724 g of octamethyl cyclotetrasiloxane, 2.34 g of a hydrolysis product of 3-aminopropyl methyl dimethoxy silane and 0.06 g of potassium hydroxide followed by neutralization with addition of 0.43 g of ethylene chlorohydrin and stripping of the low-boiling matter. The aminosiloxane C, which could be expressed by the formula

Me and B being a methyl group and a 3-aminopropyl group, respectively, had a viscosity of 15,300 centistokes and an amine equivalent of 37,000 g/mole N. The aminosiloxane C was emulsified in an aqueous medium in the same manner as in the preparation of the emulsion A in Example 1 to give an aqueous emulsion, which is referred to as the emulsion B hereinbelow.

In a similar manner to the preparation of the aminosiloxane B in Example 1, separately, another amino-substituted organopolysiloxane was prepared from 666 g of octamethyl cyclotetrasiloxane, 9.6 g of a hydrolysis product of 3-(N-2-aminoethyl)aminopropyl methyl dimethoxy silane, 6.2 g of the same silane compound as such, 0.05 g of potassium hydroxide as the catalyst and 0.4 g of ethylene chlorohydrin as the neutralizing agent. A 100 g portion of the thus prepared amino-substituted organopolysiloxane was reacted with 1.0 g of glycidyl alcohol followed by stripping of the low-boiling matter by heating at 80 τ for 5 hours under a reduced pressure of 10 mmHg to give a product having a viscosity of 3200 centerstokes, which is referred to as the aminosiloxane D hereinbelow, expressed by the formula

in which Me is a methyl group and Q is a group of the formula —CH$_2$CH$_2$CH$_2$—NH—CH$_2$CH$_2$—NH—CH$_2$.CHOH—CH$_2$OH. Further, the aminosiloxane D was emulsified in an aqueous medium in the same manner as in the preparation of the emulsion A in Example 1 to give an aqueous emulsion which is referred to as the emulsion C hereinbelow.

Thereafter, 7 parts of the emulsion B and 3 parts of the emulsion C were admixed with 0.8 part of 2-(3,4-epoxycyclohexyl)ethyl trimethoxy silane (KBM 303, a product by Shin-Etsu Chemical Co., Japan) and 0.8 part of glycidyl alcohol and diluted with 88.4 parts of water to give a diluted emulsion, which is referred to as the treatment bath II hereinbelow.

The treatment bath II was used for the treatment of the same polyester wadding in the same manner as in Example 1 to give a treated wadding which was subjected to the same tests as in Example 1 to give results as satisfactory as in Example 1.

EXAMPLES 3 to 7 and COMPARATIVE EXAMPLES 1 to 6

An amino-substituted organopolysiloxane, which is referred to as the aminosiloxane E hereinbelow, was prepared in substantially the same manner as in the preparation of the aminosiloxane C in Example 2 from 5.3 g of the same α,ω-dimethylpolysiloxane, 769 g of octamethyl cyclotetrasiloxane, 4.1 g of the same hydrolysis product of 3-aminopropyl methyl dimethoxy silane, 0.07 g of potassium hydroxide as the catalyst and 0.05 g of ethylene chlorohydrin as the neutralizing agent after the reaction. The aminosiloxane E, which could be expressed by the formula

Me and B each having the same meaning as defined before, had a viscosity of 73,500 centistokes and contained 4.2% by weight of a volatile matter determined by heating at 105 τ for 3 hours. This aminosiloxane E was emulsified in an aqueous medium in the same manner as in the preparation of the emulsion A in Example 1 to give an aqueous emulsion which is referred to as the emulsion D hereinbelow.

A series of experiments were undertaken by the combined use of the emulsion D and the emulsion C prepared in Example 2.

For comparison, an aqueous emulsion of a silanol-terminated dimethylpolysiloxane, which is referred to as the emulsion E hereinbelow, was prepared by vigorously agitating an emulsified mixture composed of 300 g of octamethyl cyclotetrasiloxane, 10 g of dodecylbenzene sulfonic acid and 600 g of water at 60 τ for 16 hours followed by neutralization to give a pH of 7 with addition of a 10% aqueous solution of sodium carbonate and contained 27% by weight of non-volatile matter determined by heating at 105 τ for 3 hours.

In the next place, each of the emulsions A, B and C prepared in Examples 1 and 2 and emulsions D and E prepared in the above described manner was admixed with an epoxysilane compound I, II or III or an aminosilane compound and a monoepoxy compound I or II shown below and indicated in Table 2 below each in an amount also indicated in the table, optionally, together with an aqueous emulsion of dibutyl tin dilaurate, referred to as DBTDL hereinbelow with dilution by adding water to prepare treatment baths III to XI. The above mentioned aqueous emulsion of DBTDL was prepared by emulsifying 10 parts of DBTDL in a solution of 2 parts of a polyoxyethylene alkylphenyl ether in 88 parts of water. The same polyester wadding as used in Example 1 was treated with these treatment baths in the same manner as in Example 1. The results of testing of the thus obtained treated waddings are also shown in Table 2.

Epoxysilane compound

I: 3-Glycidyloxypropyl trimethoxy silane
II: 3-Glycidyloxypropyl methyl dimethoxy silane
III: 2-(3,4-Epoxycyclohexyl)ethyl trimethoxy silane

Aminosilane Compound 3-(N-2-Aminoethyl)aminopropyl methyl dimethoxy silane

Monoepoxy Compound

I: Glycidyl alcohol
II: Glycidyl methacrylate

TABLE 2

|  | Examples | | | | | Comparative Examples | | | | | |
| --- | --- | --- | --- | --- | --- | --- | --- | --- | --- | --- | --- |
|  | 3 | 4 | 5 | 6 | 7 | 1 | 2 | 3 | 4 | 5 | 6 |
| Emulsion (parts) | A(10) | B(8) C(2) | C(4) D(6) | C(4) D(6) | C(4) D(6) | B(10) | C(10) | B(10) | C(4) D(6) | B(10) | B(10) |
| Epoxysilane (parts) | I(0.5) | III(1.0) | I(0.5) | I(0.5) | II(0.5) | I(0.5) | I(0.5) | — | — | I(0.5) | — |
| Aminosilane, parts | — | — | — | — | — | — | — | 1.0 | 1.0 | — | — |
| Monoepoxy compound (parts) | I(0.5) | I(1.0) | I(0.5) | II(0.5) | I(0.5) | I(0.5) | I(0.5) | — | — | — | I(0.5) |
| Emulsion of DBTDL, parts | — | — | — | — | — | — | — | 1.0 | 1.0 | — | — |
| Water, parts | 89.0 | 88.0 | 89.0 | 89.0 | 89.0 | 89.0 | 89.0 | 88.0 | 88.0 | 89.5 | 89.5 |
| Softness and smoothness | A | A | A | A | A | B | B | B | B | C | C |
| Resistance against yellowing | A | A | A | A | A | A | A | D | D | A | A |
| Durability in dry cleaning | B | B | B | B | B | C | C | B | B-C | C | C |

EXAMPLE 8 and COMPARATIVE EXAMPLES 7 and 8

A treatment bath XII was prepared in Example 8 by dissolving 1.2 parts and 0.8 part of the aminosiloxanes A and B, respectively, prepared in Example 1, 0.5 part of the epoxysilane compound I used in the preceding examples and 0.5 part of glycidyl alcohol in 97.0 parts of toluene.

For comparison in Comparative Example 7, another amino substituted organopolysiloxane, referred to as the aminosiloxane F hereinbelow, expressed by the structural formula $$Me_3Si-O+(SiMeA-O)_{72}(SiMe_2-O)_{300}SiMe_3,$$

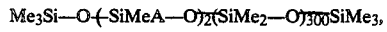

in which Me is a methyl group and A is a 3-(N-2-aminoethyl)aminopropyl group, was prepared in the same manner as in the preparation of the aminosiloxane A from 10.1 g of a hydrolysis product of 3-(N-2-aminoethyl)aminopropyl methyl dimethoxy silane, 658 g of octamethyl cyclotetrasiloxane, 4.8 g of hexamethyl disiloxane, 0.05 g of potassium hydroxide as a catalyst and 0.04 g of ethylene chlorohydrin as a neutralizing agent after the reaction. Another treatment bath was prepared in the same formulation as in the preparation of the treatment bath XII excepting replacement of 1.2 parts and 0.8 part of the aminosiloxanes A and B, respectively, with 2.0 parts of the aminosiloxane F. For further comparison in Comparative Example 8, still another treatment bath was prepared in the same formulation as in the preparation of the treatment bath XII excepting replacement of 1.2 parts of the aminosiloxane A with the same amount of the aminosiloxane F.

These treatment baths were used for the treatment of the same polyester wadding as used in Example 1 in the same procedure except that the heating was performed at 150 τ for 15 minutes. The results of the testing of these treated waddings were as shown in Table 3 below.

TABLE 3

|  | Example | Comparative Example | |
| --- | --- | --- | --- |
|  | 8 | 7 | 8 |
| Softness and smoothness | A | A | A |
| Resistance against yellowing | A | A | A |
| Durability in dry cleaning | B | C | C |

What is claimed is:

1. A silicone-based softening agent for synthetic fibers which comprises:
(A) 100 parts by weight of a combination of two organopolysiloxanes composed of
   (A-1) from 5 to 95% by weight of a first amino-substituted organopolysiloxane having a viscosity in the range from 100 to 1,000,000 centistokes at 25 τ and having a substantially linear molecular structure represented by the general formula $$XO-(SiR_2-O)_m(SiZR-O)_nX,$$

in which R is a monovalent hydrocarbon group having from 1 to 20 carbon atoms, Z is an amino-substituted monovalent hydrocarbon group of the formula $$-R^1-(NHCH_2CH_2)_aNR^2_2,$$

$R^1$ being a divalent hydrocarbon group having 1 to 10 carbon atoms, $R^2$ being a hydrogen atom or a monovalent hydrocarbon group having 1 to 20 carbon atoms and the subscript a being zero or a positive integer not exceeding 4, X is a hydrogen atom or a monovalent hydrocarbon group having 1 to 10 carbon atoms, and m and n are each a positive integer, the number of the amino-substituted groups denoted by Z in a molecule being 1% or less of the total number of the groups denoted by R and Z, and
   (A-2) from 95 to 5% by weight of a second amino-substituted organopolysiloxane which is a reaction product of
      (A-2a) a liquid amino-substituted organopolysiloxane represented by the average unit formula $$Z_bR_cSiO_{(4-b-c)/2},$$

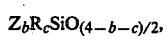

in which Z and R each have the same meaning as defined above, b is a positive number not exceeding 1 and c is a positive number smaller than 2 with the proviso that b+c is in the range from 1.9 to 2.1, and
      (A-2b) a liquid organic epoxy compound having at least one epoxy group in a molecule in such an amount that from 0.01 to 20 moles of the epoxy groups are provided per mole of the nitrogen atoms in the amino-substituted organopolysiloxane as the component (A-2a);
(B) from 1 to 50 parts by weight of an epoxy-containing alkoxy silane compound; and
(C) from 1 to 50 parts by weight of a monoepoxy compound represented by the general formula $$G-R^3-OY,$$

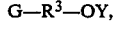

in which G is a group of epoxy residue, $R^3$ is a divalent hydrocarbon group and Y is a hydrogen atom or a group selected from the class consisting of acyl groups, acryl group, methacryl group and silyl groups represented by the general formula $\text{+SiMe}_2\text{—O})_{\overline{e}}\text{SiMe}_3,$ Me being a methyl group and e being zero or a positive integer not exceeding 5.

2. The silicone-based softening agent for synthetic fibers as claimed in claim 1 wherein the monoepoxy compound as the component (C) is glycidyl alcohol.

3. The silicone-based softening agent for synthetic fibers as claimed in claim 1 wherein the component (A) is a combination of from 50 to 90% by weight of the first amino-substituted organopolysiloxane as the component (A-1) and from 50 to 10% by weight of the second amino-substituted organopolysiloxane as the component (A-2).

* * * * *